US008401372B2

(12) United States Patent
Watanabe et al.

(10) Patent No.: US 8,401,372 B2
(45) Date of Patent: Mar. 19, 2013

(54) IMAGE RECORDING APPARATUS, IMAGE RECORDING METHOD AND STORAGE MEDIUM FOR RECORDING TELEVISION PROGRAMS

(75) Inventors: Jun Watanabe, Kanagawa (JP); Toshiyuki Katsumoto, Tokyo (JP); Shunsuke Kunieda, Tokyo (JP); Yuji Murakami, Tokyo (JP); Kae Nagano, Tokyo (JP); Hiroyuki Yoshizu, Kanagawa (JP); Masayoshi Miura, Chiba (JP)

(73) Assignee: Sony Corporation, Tokyo (JP)

( * ) Notice: Subject to any disclaimer, the term of this patent is extended or adjusted under 35 U.S.C. 154(b) by 1446 days.

(21) Appl. No.: 11/561,750

(22) Filed: Nov. 20, 2006

(65) Prior Publication Data

US 2007/0092206 A1 Apr. 26, 2007

Related U.S. Application Data

(62) Division of application No. 09/905,048, filed on Jul. 13, 2001, now abandoned.

(30) Foreign Application Priority Data

Jul. 14, 2000 (JP) ................................. 2000-215242
May 15, 2001 (JP) ................................. 2001-144348

(51) Int. Cl.
*H04N 5/76* (2006.01)
*H04N 5/92* (2006.01)

(52) U.S. Cl. ......... 386/292; 386/293; 386/337; 386/341

(58) Field of Classification Search .................. 386/291, 386/292, 293, 235, 341; 725/141, 58
See application file for complete search history.

(56) References Cited

U.S. PATENT DOCUMENTS

| 5,187,589 | A | 2/1993 | Kono et al. |
| 5,307,173 | A | 4/1994 | Yuen et al. |
| 5,809,202 | A | 9/1998 | Gotoh et al. |
| 6,078,726 | A | 6/2000 | Gotoh et al. |
| 6,185,360 | B1 | 2/2001 | Inoue et al. |
| 6,208,799 | B1 * | 3/2001 | Marsh et al. ................ 725/141 |
| 6,240,240 | B1 | 5/2001 | Nagano et al. |
| 6,344,878 | B1 | 2/2002 | Emura |
| 6,445,872 | B1 | 9/2002 | Sano et al. |
| 7,003,213 | B1 | 2/2006 | Hasegawa |
| 7,017,179 | B1 | 3/2006 | Asamoto et al. |

FOREIGN PATENT DOCUMENTS

| JP | 3-215781 | 9/1991 |
| JP | 10-199142 | 7/1998 |
| JP | 2000-152110 | 5/2000 |
| WO | WO 92/22983 | 12/1992 |
| WO | WO99/04561 | 1/1999 |

* cited by examiner

*Primary Examiner* — Vincent Boccio
(74) *Attorney, Agent, or Firm* — Oblon, Spivak, McClelland, Maier & Neustadt, L.L.P.

(57) ABSTRACT

An image recording apparatus in which recording preset information, constituted by a recording start time and a recording end time, is stored for each preset program to be unattended recorded. If there is any overlap between the recording start times and the recording end times of the preset programs that are to be recorded, a warning is generated; and the overlapping preset programs are prioritized for unattended recording.

8 Claims, 6 Drawing Sheets

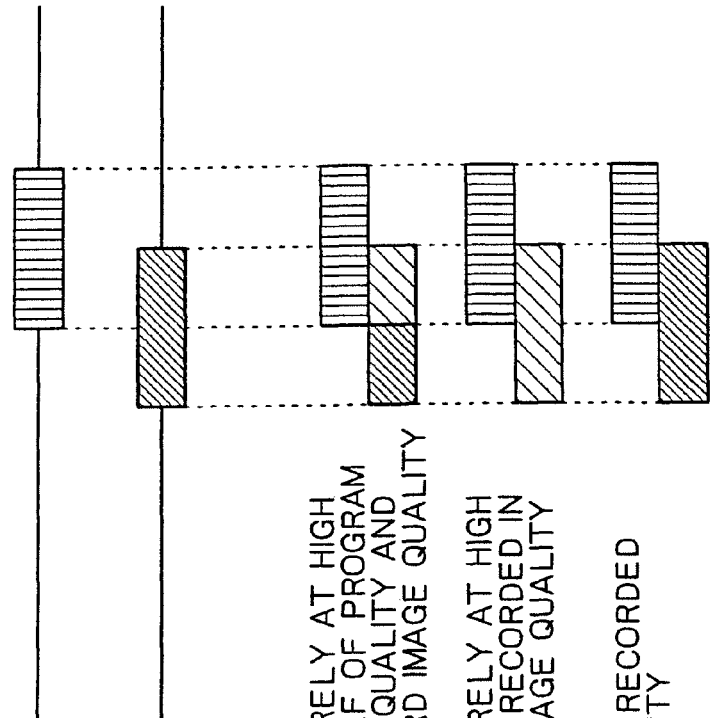

# IMAGE RECORDING APPARATUS, IMAGE RECORDING METHOD AND STORAGE MEDIUM FOR RECORDING TELEVISION PROGRAMS

CROSS-REFERENCE TO RELATED APPLICATIONS

This application is a Divisional of U.S. patent application Ser. No. 09/905,048, filed Jul. 13, 2001, and claims priority to Japanese Patent Application No. 2001-215242, filed Jul. 14, 2000, and Japanese Patent Application No. 2001-144348, filed May 15, 2001. The contents of U.S. patent application Ser. No. 09/905,048 are incorporated herein by reference in their entirety.

BACKGROUND OF THE INVENTION

The present invention relates to an image recording apparatus and an image recording method. More particularly, the invention relates to an apparatus and a method whereby TV programs are preset for unattended recording.

Today, technological innovations for recording and reproducing TV programs abound: greater availability of storage media such as hard discs with larger capacities at lower costs, techniques for higher-speed access to the storage medium for recording and playback, processes for recording, reproducing and transmitting data at higher speeds than ever, and methods for compression-coding at higher speeds of video and audio signals involving moving images. These innovative systems and schemes have given rise to the development of a new type of image recording apparatus capable of compression-coding video and audio signals of TV programs for recording, decoding and reproduction.

The above type of image recording apparatus can record video and audio signals of a plurality of TV programs on a mass storage medium typified by hard discs. Given such recording capabilities, the image recording apparatus should preferably be equipped with a program preset function for presetting a plurality of TV programs for unattended recording, as well as a recording control function for recording the preset programs onto the storage medium.

The image recording apparatus capable of letting users preset TV programs for unattended recording typically permits preselection of the start and end times of each desired TV program to be recorded; program input routes over which to record the programs such as channel numbers; and levels of image quality at which the recordings are to be made. Given these settings, the apparatus is generally capable of verifying whether any preset TV programs for unattended recording overlap with one another between their preset time zones.

The question is what to do if any TV programs are found to overlap between their preset time zones. The image recording apparatus should preferably deal with such overlapping preset TV programs in a way that is easy to handle and optimally satisfying to the user.

It is therefore an object of the present invention to provide an apparatus and a method for dealing with overlapping preset TV programs for unattended recording between their preset time zones in a manner highly manageable and maximally satisfying to the user.

SUMMARY OF THE INVENTION

In carrying out the invention and according to a first aspect thereof, there is provided an image recording apparatus comprising: an information storing element for storing recording preset information constituted by a recording start time and a recording end time of each of preset programs for unattended recording, and by a program input route through which to input each of the preset programs; an overlap judging element for judging whether any of the preset programs for unattended recording overlap between the recording start times and the recording end times of the programs; an overlap warning element for warning of any overlapping preset programs that are judged to exist; and a priority presetting element for prioritizing the overlapping preset programs for unattended recording.

According to a second aspect of the invention, there is provided an image recording apparatus comprising: an information storing element for storing recording preset information constituted by a recording start time and a recording end time of each of preset programs for unattended recording, a program input route through which to input each of the preset programs, and an image recording quality; an overlap judging element for judging whether any of the preset programs for unattended recording overlap between the recording start times and the recording end times of the programs; a simultaneous recording judging element for judging whether the overlapping preset programs can be recorded simultaneously; an overlap warning element for giving a warning if any of the overlapping preset programs are not judged to be simultaneously recordable; and a priority presetting element for prioritizing the overlapping preset programs for unattended recording.

According to a third aspect of the invention, there is provided an image recording apparatus comprising: an information storing element for storing recording preset information constituted by a recording start time and a recording end time of each of preset programs for unattended recording, a program input route through which to input each of the preset programs, and an image recording quality; an overlap judging element for judging whether any of the preset programs for unattended recording overlap between the recording start times and the recording end times of the programs; a determining element for determining whether the overlapping preset programs belong to a single compression-coded transport stream; a simultaneous recording judging element for judging whether the overlapping preset programs can be recorded simultaneously based on what is determined by the determining element; an overlap warning element for giving a warning if any of the overlapping preset programs are not judged to be simultaneously recordable; and a priority presetting element for prioritizing the overlapping preset programs for unattended recording.

According to a fourth aspect of the invention, there is provided an image recording apparatus comprising: an information storing element for storing recording preset information constituted by a recording start time and a recording end time of each of preset programs for unattended recording, a program input route through which to input each of the preset programs, and an image recording quality; an overlap judging element for judging whether any of the preset programs for unattended recording overlap between the recording start times and the recording end times of the programs; a simultaneous recording judging element for judging whether the overlapping preset programs can be recorded simultaneously; an overlap warning element for giving a warning if any of the overlapping preset programs are not judged to be simultaneously recordable; a priority presetting element for prioritizing the overlapping preset programs for unattended recording; a multiplex recording element for multiplexing a plurality of programs into a single compression-coded transport stream for unattended recording; and a controlling element for controlling recording rates of the multiplex recording element during unattended recording in accordance with how the overlapping preset programs are prioritized by the priority presetting element.

According to fifth aspect of the invention, there is provided an image recording method comprising the steps of: storing recording preset information constituted by a recording start time and a recording end time of each of preset programs for unattended recording, and by a program input route through which to input each of the preset programs; judging whether any of the preset programs for unattended recording overlap between the recording start times and the recording end times of the programs; warning of any overlapping preset programs that are judged to exist; and prioritizing the overlapping preset programs for unattended recording.

According to a sixth aspect of the invention, there is provided an image recording method comprising the steps of: storing recording preset information constituted by a recording start time and a recording end time of each of preset programs for unattended recording, a program input route through which to input each of the preset programs, and an image recording quality; judging whether any of the preset programs for unattended recording overlap between the recording start times and the recording end times of the programs; judging whether the overlapping preset programs can be recorded simultaneously; giving a warning if any of the overlapping preset programs are not judged to be simultaneously recordable; and prioritizing the overlapping preset programs for unattended recording.

According to a seventh aspect of the invention, there is provided an image recording method comprising the steps of: storing recording preset information constituted by a recording start time and a recording end time of each of preset programs for unattended recording, a program input route through which to input each of the preset programs, and an image recording quality; judging whether any of the preset programs for unattended recording overlap between the recording start times and the recording end times of the programs; determining whether the overlapping preset programs belong to a single compression-coded transport stream; judging whether the overlapping preset programs can be recorded simultaneously based on what is determined in the determining step; giving a warning if any of the overlapping preset programs are not judged to be simultaneously recordable; and prioritizing the overlapping preset programs for unattended recording.

According to an eighth aspect of the invention, there is provided an image recording method comprising the steps of: storing recording preset information constituted by a recording start time and a recording end time of each of preset programs for unattended recording, a program input route through which to input each of the preset programs, and an image recording quality; judging whether any of the preset programs for unattended recording overlap between the recording start times and the recording end times of the programs; judging whether the overlapping preset programs can be recorded simultaneously; giving a warning if any of the overlapping preset programs are not judged to be simultaneously recordable; prioritizing the overlapping preset programs for unattended recording; and changing rates of program recording in accordance with how the overlapping preset programs are prioritized, so that the overlapping preset programs are multiplexed into a single compression-coded transport stream for unattended recording.

Other objects, features and advantages of the invention will become more apparent upon a reading of the following description and appended drawings.

BRIEF DESCRIPTION OF THE DRAWINGS

FIG. 6 is a schematic view illustrating how preset digital broadcast programs for unattended recording may typically overlap between their preset time zones.

DETAILED DESCRIPTION OF THE PREFERRED EMBODIMENTS (System Configuration of the Recording and Reproducing Apparatus)

Figure 1:
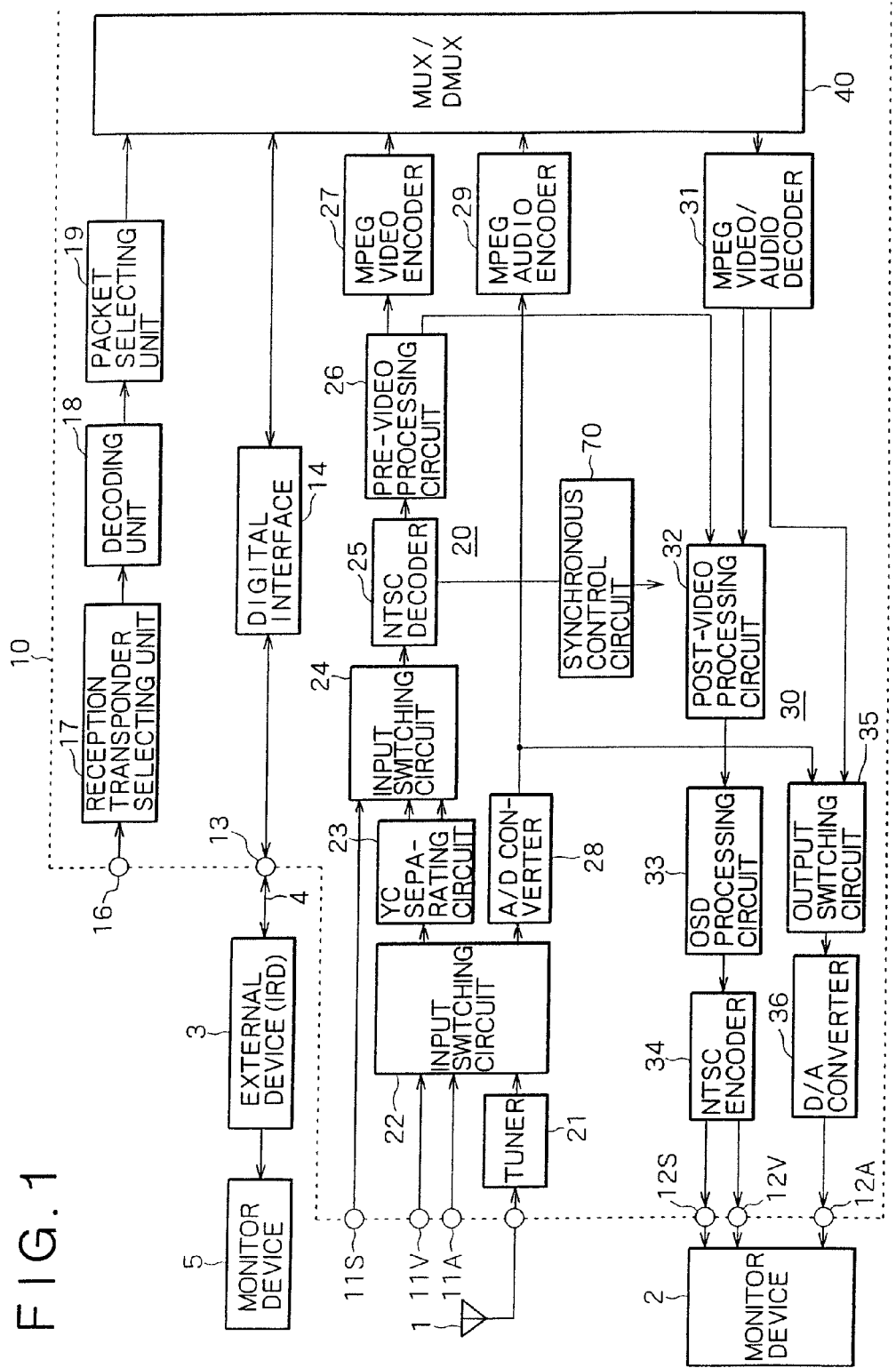
FIG. 1 is a partial block diagram of a recording and reproducing apparatus embodying the invention.
Figure 2:
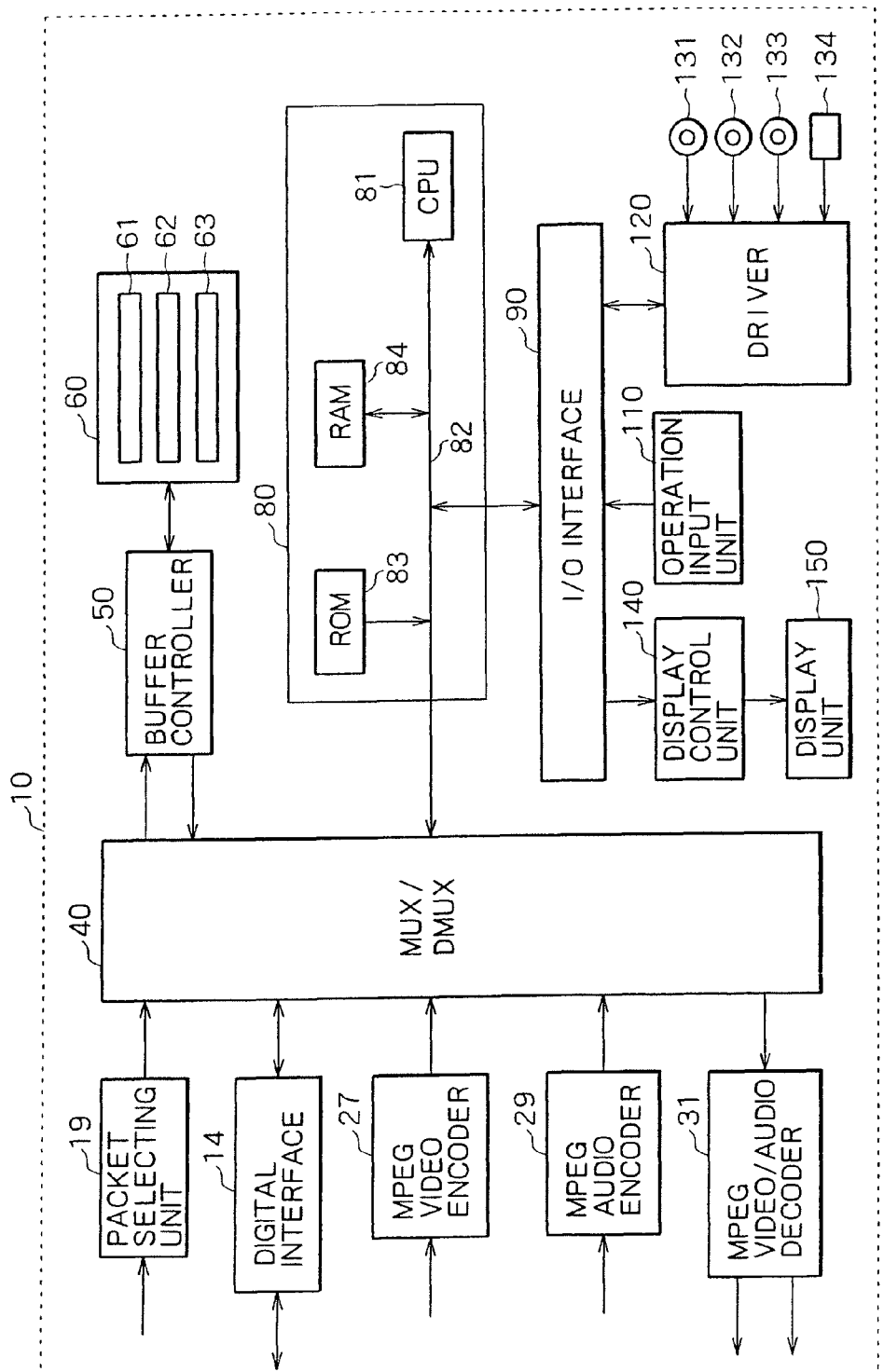
FIG. 2 is another partial block diagram of the recording and reproducing apparatus of the invention.

FIGS. 1 and 2 are block diagrams of a recording and reproducing apparatus 10 practiced as one embodiment of this invention. The apparatus 10 involves having video and audio signals compression-coded and multiplexed by MPEG (Moving Picture Experts Group) standards into an MPEG system transport stream (TS). The transport stream thus generated is written to and read from hard disc units in a hard disc drive (HDD) of the apparatus 10 for recording and reproduction.

In the description that follows, analog video and audio signals will be referred to as the video signal and the audio signal respectively; digital video and audio signals will be called either digital video data and digital audio data, or simply video data and audio data.

The recording and reproducing apparatus 10 of this invention has an antenna 1 for receiving analog TV broadcast programs. The apparatus 10 comprises: analog input terminals 11V, 11A and 11S; analog output terminals 12V, 12A and 12S; a digital I/O terminal 13; a digital interface 14; a digital broadcast RF signal input terminal 16; a reception transponder selecting unit 17; a decoding unit 18; a packet selecting unit 19; an input processing unit 20; an output processing unit 30; a multiplexer/demultiplexer 40; a buffer controller 50; a hard disc drive 60; a synchronous control circuit 70; a system controller 80; an I/O interface 90; an operation input unit 110; a driver 120; a display control unit 140; and a display unit 150.

The hard disc drive 60 of this embodiment includes three hard disc units 61, 62 and 63. A transport stream is recorded onto any of the three units and is reproduced therefrom.

The system controller 80 has a CPU (central processing unit) 81. A host bus 82 coupled to the CPU 81 is connected with a ROM (read only memory) 83 and a RAM (random access memory) 84.

The ROM 83 accommodates beforehand programs to be executed by the CPU 81. The CPU 81 retrieves the necessary programs from the ROM 83 when controlling components of the recording and reproducing apparatus 10. The programs and data required by the CPU 81 to control various parts of the apparatus 10 in operation are written as needed to the RAM 84.

The operation input unit 110 is made up of a keyboard, a mouse, buttons, switches and a remote commander. The unit 110 is connected to the host bus 82 via the I/O interface 90.

The driver 120 is also connected to the host bus 82 through the I/O interface 90. The driver 120 is arranged to accommodate a magnetic disc 131, an optical disc 132, a magneto-optical disc 133, or a semiconductor memory 134. Programs retained on these media are installed into the RAM 84 in a manner to be described later.

The display unit 150 is typically constituted by a liquid crystal display. The display unit 150 is connected to the host bus 82 via the display control unit (display drive unit) 140 and I/O interface 90.

(Analog Input Processing and Recording)

Analog television broadcast signals received by the antenna 1 are selected by a tuner 21 under control of the system controller 80 operated by the operation input unit 110. The tuner 21 yields a composite video signal and an audio signal of the selected channel. The signals are forwarded to one input terminal of an input switching circuit 22.

The input terminals 11V and 11A are supplied with a composite video signal and an audio signal, respectively, from an external device. The input terminal 11S is fed with a separate video signal from the external device.

The composite video signal from the input terminal 11V and the audio signal from the input terminal 11A are sent to another input terminal of the input switching circuit 22. The input switching circuit 22, switched by the system controller 80, selects one of the composite video signals and its accompanying audio signal for output.

The composite video signal from the input switching circuit 22 is separated by a YC separating circuit 23 into a luminance signal and a color-difference signal. The separated signals are fed to one input terminal of another input switching circuit 24. The separate video signal (made of a luminance signal and a color-difference signal) from the input terminal 11S is supplied to another input terminal of the input switching circuit 24. Switched by the system controller 80, the input switching circuit 24 selects one of the luminance signals and its accompanying color-difference signal for output.

The luminance signal and color-difference signal from the input switching circuit 24 are subjected to analog-to-digital conversion (A/D) by an NTSC (National Television System Committee) decoder 25 before being chroma-encoded. After the processing, the NTSC decoder 25 yields component video data.

The NTSC decoder 25 further separates the luminance signal coming from the input switching circuit 24 into a frame synchronizing signal and a line synchronizing signal. The separated synchronizing signals are used as a basis for generating a clock and a field discrimination signal. The synchronizing signals, the clock, and the field discrimination signal thus generated are supplied to the synchronous control circuit 70. The circuit 70 uses the supplied signals as a basis for generating clock and timing signals that are sent to those components of the recording and reproducing apparatus 10 which need the signals.

The video data from the NTSC decoder 25 are subjected to prefiltering and other processes by a pre-video processing circuit 26. The data thus processed are fed to an MPEG video encoder 27 and a post-video processing circuit 32 in the output processing unit 30.

The MPEG video encoder 27 subjects the video data from the pre-video processing circuit 26 to coding such as block DCT (discrete cosine transform), to generate a video elementary stream (ES). The video elementary stream thus generated is fed to the multiplexer/demultiplexer 40.

Meanwhile, the audio signal from the input switching circuit 22 is converted to digital audio data by an A/D converter 28. The converted data are supplied to an MPEG audio encoder 29 as well as to an output switching circuit 35 in the output processing unit 30.

The MPEG audio encoder 29 subjects the audio data from the A/D converter 28 to MPEG compression coding, generating an audio elementary stream. The audio elementary stream thus produced is sent to the multiplexer/demultiplexer 40.

The multiplexer part of the multiplexer/demultiplexer 40 multiplexes the video elementary stream from the MPEG video encoder 27, the audio elementary stream from the MPEG audio encoder 29, and various control signals into an MPEG system transport stream. The transport stream thus generated is sent to a buffer controller 50.

Given the continuous transport stream from the multiplexer/demultiplexer 40, the buffer controller 50 forwards an intermittent transport stream to the hard disc drive 60. That is, the input transport stream is held temporarily in a buffer when the hard disc drive 60 performing a seek is not ready for a write operation. When the hard disc drive 60 is ready for a write, the transport stream is retrieved from the buffer at a rate higher than the input rate for output to the hard disc drive 60. In this manner, the transport stream continuously input to the buffer controller 50 is written uninterrupted to the hard disc units 61 through 63.

Under control of the system controller 80, the hard disc drive 60 writes the transport stream to the hard disc units 61 through 63. The protocol for exchanges between the buffer controller 50 and the hard disc drive 60 is typically IDE (Integrated Drive Electronics).

(Reproduction and Analog Output Processing)

At the time of reproduction, the hard disc drive 60 reads the transport stream from the hard disc units 61 through 63 under control of the system controller 80. The retrieved transport stream is output to the buffer controller 50. In the reverse of recording, the transport stream intermittently sent from the hard disc drive 60 is converted to a continuous transport stream before being sent to the multiplexer/demultiplexer 40.

The demultiplexer part of the multiplexer/demultiplexer 40 analyzes a header of the continuous transport stream to separate a PES (Packetized Elementary Stream) from the stream. The PES thus analyzed and separated is supplied to an MPEG video/audio decoder 31.

The MPEG video/audio decoder 31 separates the PES coming from the multiplexer/demultiplexer 40 into a video elementary stream and an audio elementary stream. The MPEG video decoder part of the video/audio decoder 31 decodes the video elementary stream for conversion into baseband video data; the MPEG audio decoder part decodes the audio elementary stream for conversion into baseband audio data. After the conversion, the video data are sent to the post-video processing circuit 32 and the audio data to the output switching circuit 35.

Under the direction of the system controller 80, the post-video processing circuit 32 performs such processes as switching between video data from the MPEG video/audio decoder 31 and video data from the pre-video processing circuit 26, composing these data, and subjecting the data to a post-filtering process.

The post-video processing circuit 32 then generates a plurality of representative screens for GUI (graphical user interface) which are reduced in size so as to be pasted onto windows. The processed video data are fed from the circuit 32 to an OSD (on-screen display) processing circuit 33.

Under the direction of the system controller 80, the OSD processing circuit 33 generates video data corresponding to text information. The generated video data are multiplexed onto the window-ready video data from the post-video processing circuit 32. The multiplexed video data are sent to an NTSC encoder 34.

The NTSC encoder 34 either converts the video data (component video data) from the OSD processing circuit 33 into luminance data and color-difference data, or simply subjects the video data to digital-to-analog (D/A) conversion to generate a separate video signal and a composite video signal in analog format. The separate video signal is led to the output terminal 12S while the composite video signal is forwarded to the output terminal 12V.

Meanwhile, under control of the system controller 80, the output switching circuit 35 selectively extracts either the audio data from the MPEG video/audio decoder 31 or the audio data from the A/D converter 28. The selected audio data are converted to an analog audio signal by a D/A converter 36 before being led to the output terminal 12A.

The separate video signal, composite video signal and audio signal having reached the output terminals 12S, 12V and 12A respectively are output to a monitor device 2 such as a TV set for audio and visual reproduction.

(Writing and Reading of Video/Audio Data to and from the External Device)

The recording and reproducing apparatus 10 of this embodiment has the digital interface 14 connected interposingly between the digital I/O terminal 13 and the multiplexer/demultiplexer 40, and an external device 3 is connected to the digital I/O terminal 13. In this setup, a transport stream entered from the external device 3 is written to the hard disc units 61 through 63; a transport stream read from the hard disc drives 61 through 63 is output to the external device 3.

The external device 3 is typically an IRD (integrated receiver decoder), a personal computer or the like. The digital interface 14 is typically an IEEE (Institute of Electrical and Electronics Engineers) 1394 digital interface. A serial bus 4 such as an IEEE 1394 serial bus connects the external device 3 with the digital I/O terminal 13.

The transport stream reaching the digital I/O terminal 13 from the external device 3 via the serial bus 4 is interfaced by the digital interface 14 before being sent to the multiplexer/demultiplexer 40. In turn, the multiplexer/demultiplexer 40 forwards the transport stream to the buffer controller 50. The buffer controller 50 causes the hard disc drive 60 to write the transport stream to the hard disc units 61 through 63.

At the same time, the demultiplexer part of the multiplexer/demultiplexer 40 separates a PES from the transport stream being recorded and feeds the separated PES to the MPEG video/audio decoder 31. Given the PES, the MPEG video/audio decoder 31 yields an analog video signal and an analog audio signal which are sent to the output terminals 12V, 12S and 12A.

Upon reproduction, the hard disc drive 60 reads a transport stream from the hard disc units 61 through 63. The retrieved transport stream is output to the buffer controller 50 which then forwards the stream to the multiplexer/demultiplexer 40. The transport stream is interfaced by the digital interface 14 before being output to the digital I/O terminal 13. From the digital I/O terminal 13, the transport stream is sent to the external device 3 over the serial bus 4. Given the transport stream, a monitor device 5 connected to the external device 3 provides video and audio output.

Concurrently, the demultiplexer part of the multiplexer/demultiplexer 40 separates a PES from the transport stream being reproduced and feeds the separated PES to the MPEG video/audio decoder 31. Given the PES, the MPEG video/audio decoder 31 yields a reproduced analog video signal and a reproduced analog audio signal which are sent to the output terminals 12V, 12S and 12A.

(Recording of Digital Broadcast Programs)

The recording and reproducing apparatus 10 of this embodiment has the reception transponder selecting unit 17, decoding unit 18 and packet selecting unit 19 connected interposingly between the digital broadcast RF signal input terminal 16 and the multiplexer/demultiplexer 40. When a digital broadcast RF signal is input to the digital broadcast RF signal input terminal 16 of this setup, a digital broadcast program may be recorded to the hard disc units 61 through 63.

More specifically, the reception transponder selecting unit 17 first selects the digital broadcast RF signal desired to be received and decoded. The decoding unit 18 decodes a transport stream out of the selected RF signal. The packet selecting unit 19 selectively separates packets of the desired program from the decoded transport stream.

In that case, the packet selecting unit 19 may selectively separate packets of a plurality of programs simultaneously from the decoded transport stream as long as the multiplexer/demultiplexer 40, buffer control 50 and hard disc drive 60 can keep up with the data being processed.

The packets separated by the packet selecting unit 19 are sent to the multiplexer/demultiplexer 40 that in turn forwards the packets to the buffer controller 50. Given the packets, the buffer controller 50 causes the hard disc drive 60 to write them to the hard disc units 61 through 63.

At the same time, the demultiplexer part of the multiplexer/demultiplexer 40 separates a PES from the transport stream being recorded and feeds the separated PES to the MPEG video/audio decoder 31. On receiving the PES, the MPEG video/audio decoder 31 generates an analog video signal and an analog audio signal which are sent to the output terminals 12V, 12S and 12A.

In recording program packets to the hard disc units 61 through 63, the system controller 80 controls the multiplexer/demultiplexer 40, buffer controller 50 and hard disc drive 60 in such a manner that high-priority preset programs for unattended recording are recorded preferentially, as will be described later.

On the other hand, the system controller 80 adjusts recording rates and image recording quality levels of low-priority programs in such a manner that the programs may be recorded optimally as permitted by the remaining system resources of the recording and reproducing apparatus 10. These resources include remaining capabilities of the multiplexer/demultiplexer 40, buffer controller 50 and hard disc drive 60, as well as recordable capacities of the hard disc units 61 through 63.

FIGS. 1 and 2 show a setup in which the reception transponder selecting unit 17, decoding unit 18 and packet selecting unit 19 constitute one system. Alternatively, two or more systems of the same kind may be furnished. Such a multiple-system setup allows programs multiplexed in different transport streams to be received and recorded at the same time.

EXAMPLES OF PRESETTING FOR UNATTENDED RECORDING

What follows is a description of how user-preset programs for unattended recording are typically processed by the above-described recording and reproducing apparatus 10 according to the invention.

First Example

Figure 3:
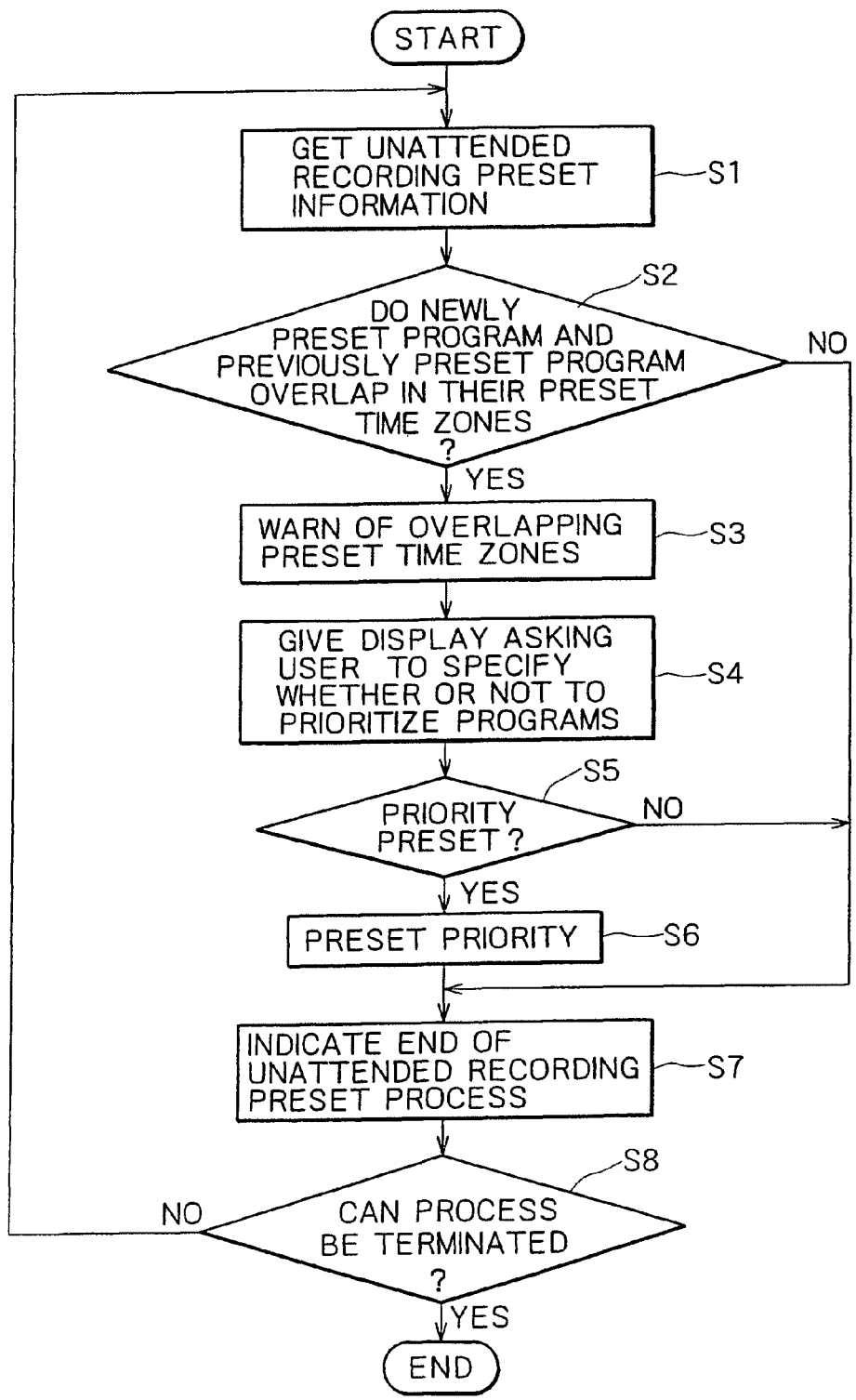
FIG. 3 is a flowchart of steps constituting an unattended recording preset routine.

FIG. 3 is a flowchart of steps constituting an unattended recording preset routine 160 performed by the system controller 80. The routine 160 is used to preset analog television broadcast programs received by the antenna 1, video and audio signals input to the analog input terminals 11V, 11S and 11A from an external unit, or a transport stream fed to the digital I/O terminal 13 from the external device 3, for unattended recording.

The unattended recording preset routine 160 is started when the user carries out recording preset operations on the operation input unit 110. In step S1, the system controller 80 receives unattended recording preset information made up of the channel number of a desired program (input route), a recording start time, a recording end time, and image recording quality, and writes the information to the RAM 84.

In step S2, the system controller 80 compares the preset information received in step S1 with the previously stored unattended recording preset information in the RAM 84 to see if any programs overlap between their recording start times and recording end times. If any programs are judged to overlap, step S3 is reached in which an overlap warning is indicated on the display unit 150. In step S4, a prompt indication is shown on the display unit 150 asking the user to specify whether or not to prioritize the overlapping preset programs.

Figure 4:
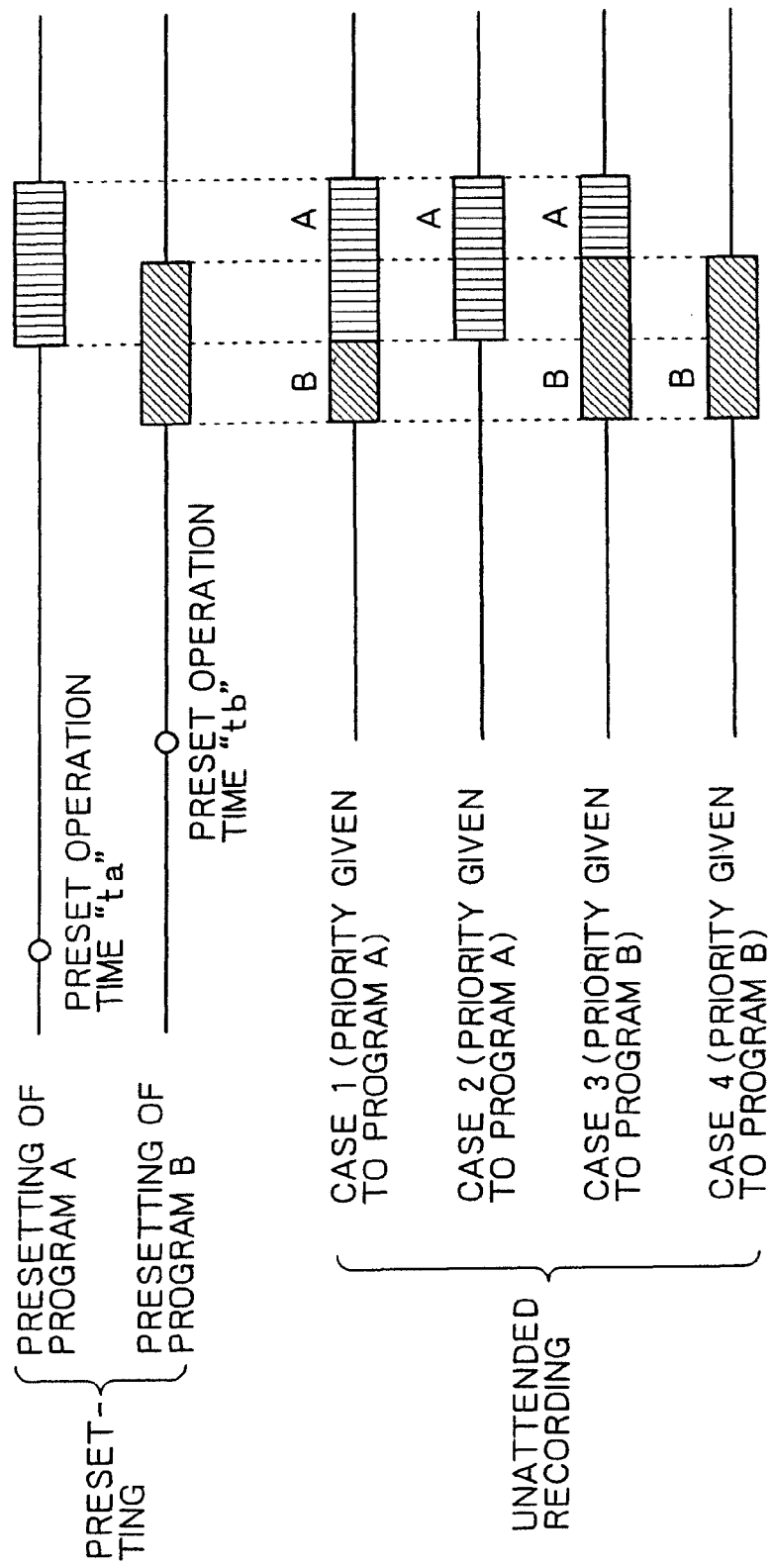
FIG. 4 is a schematic view showing how preset programs for unattended recording may typically overlap between their preset time zones.

FIG. 4 schematically shows that whereas a program A is first preset at a time "ta" for unattended recording, a program B is preset at a later time "tb" for unattended recording, so that the programs A and B partially overlap between their recording start times and recording end times.

In the example of FIG. 4, the user has two options: to give priority to one of the programs A and B (i.e., prioritized), or not to give priority to any of them.

In step S5, the system controller 80 determines whether or not to prioritize the preset programs based on the presence or absence of a response from the user or on the contents of such a response. In the example of FIG. 4, if the user's response is to give priority to one of the programs A and B, the system controller 80 recognizes the preferential selection and goes to step S6. In step S6, the system controller 80 adds priority preset information to the unattended recording preset information in the RAM 84 regarding the preferred program. In step S7, an indication of the end of the unattended recording preset process appears on the display unit 150. At this point, the user watching the display may change the preset information as needed.

In step S8, the system controller 80 determines whether or not to end the unattended recording preset process. If no response comes from the user specifying changes in the preset information, the system controller 80 judges that the process can now be terminated and deactivates the unattended recording preset routine.

If in step S8 the user specifies any change in the preset information for unattended recording, step S1 is reached again from step S8, and the unattended recording preset process is repeated from the beginning.

If in step S5 the system controller 80 judges that the user has no intention of prioritizing the overlapping preset programs, step S5 is followed directly by step S7. If in step S2 the system controller 80 judges that no preset programs overlap between their recording start and end times (this also applies to a case where no previously preset program exists), then the system controller 80 goes directly to step S7 from step S2.

With the above-described unattended recording preset process accomplished, the system controller 80 causes the preset programs to be recorded unattended accordingly.

If the user gives priority to the program A in the example of FIG. 4, one of two cases applies according to default settings of the apparatus or as per previously established user preferences: in case 1, part of the program B is recorded in the nonoverlapping time zone; in case 2, no part of the program B is recorded. If the user prefers giving priority to the program B, again one of two cases applies according to default settings of the apparatus or as per previously established user preferences: in case 3, part of the program A is recorded in the nonoverlapping time zone; in case 4, no part of the program A is recorded.

If the user does not give priority to any of the programs A and B, one of the above cases 1 through 4 applies according to default settings of the apparatus: the program preset earlier or later takes precedence over the program preset later or earlier respectively; or the program to be broadcast earlier or later is given priority over the program to be broadcast later or earlier respectively.

For analog TV broadcast reception, the apparatus may include a plurality of blocks each comprising the tuner 21, YC separating circuit 23, NTSC decoder 25, pre-video processing circuit 26, MPEG video encoder 27, A/D converter 28, and MPEG audio encoder 29 constituting the input processing unit 20. Such a multiple-block setup allows a plurality of programs to be recorded simultaneously.

In that case, the system controller 80 in step S2 computes the number of programs that may be recorded simultaneously in accordance with the number of input processing blocks configured; with the operating speeds of the multiplexer/demultiplexer 40, buffer controller 50 and hard disc drive 60; and with the processing speed dictated by the preset image recording quality. A check is then made to see if the currently preset program can be recorded on the basis of whether or not the recordable program count obtained above is exceeded by the total number of preset programs.

As described, if preset programs are judged to overlap between their recording start times and recording end times, the system controller 80 checks to see if the programs may be recorded simultaneously. If simultaneous recording of multiple preset programs is not judged to be available, the overlapping preset programs may be prioritized so that one or a plurality of them are preferentially recorded. In the case of low-priority preset programs, the system controller 80 verifies whether it is possible to record them simultaneously at reduced levels of image recording quality, i.e., by lowering the transfer rate or by tolerating jerky frame feeds. If the low-priority preset programs are judged to be simultaneously recordable under such less favorable conditions, the system controller 80 allows them to be recorded accordingly.

Second Example

Figure 5:
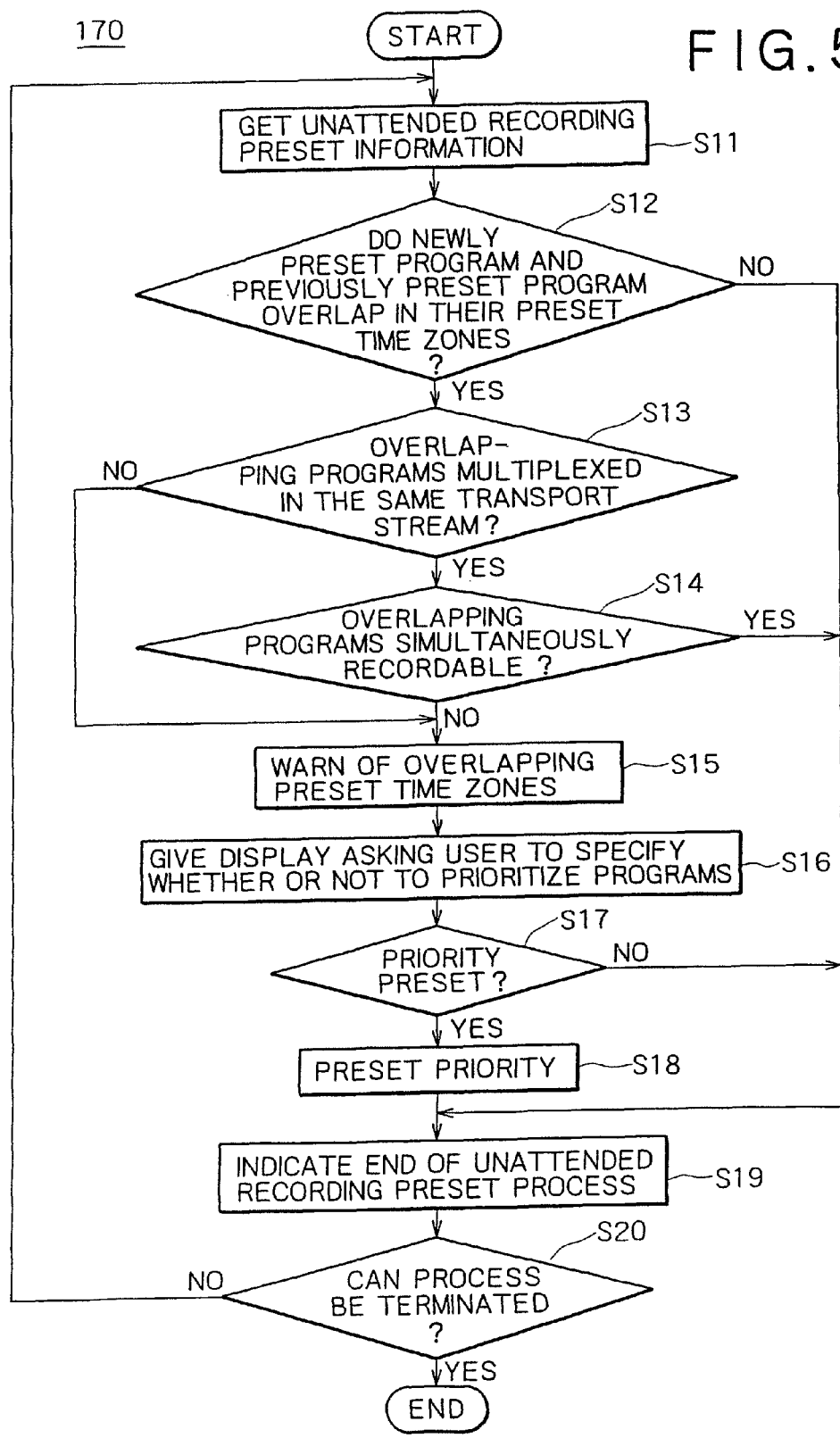
FIG. 5 is a flowchart of steps constituting a digital broadcast unattended recording preset routine.

FIG. 5 is a flowchart of steps constituting another unattended recording preset routine. This is a digital broadcast unattended recording preset routine 170 performed by the system controller 80 when an RF signal is input to the digital broadcast RF signal input terminal 16.

The digital broadcast unattended recording preset routine 170 is started when the user carries out recording preset operations on the operation input unit 110. In step S11, the system controller 80 receives unattended recording preset information made up of the channel number of a desired program (input route), a recording start time, a recording end time, and image recording quality, and writes the information to the RAM 84.

In step S12, the system controller 80 compares the preset information received in step S11 with the previously stored unattended recording preset information in the RAM 84 to see if any programs overlap between their recording start times and recording end times. If any programs are judged to overlap, step S13 is reached. In step S13, the system controller 80 checks to see whether the newly preset program is multiplexed in the same transport stream to which the previously preset program belongs.

If the newly preset program and the previously preset program are found multiplexed in the same transport stream, it is possible to record the two programs simultaneously. In that case, step S13 is followed by step S14. In step S14, the system controller 80 judges whether the two programs can be recorded simultaneously at requested levels of image quality based on the remaining recordable capacities of the hard disc units 61 through 63; on the operating speeds of the multiplexer/demultiplexer 40, buffer controller 50 and hard disc drive 60; and on the processing speed dictated by the preset image recording quality.

If the two programs are not judged to be simultaneously recordable at the requested levels of image quality, step S14 is followed by step S15. In step S15, the display unit 150 gives a warning that the two programs overlap between their recording start times and recording end times.

If in step S13 the newly preset program is not found multiplexed in the same transport stream that includes the previously preset program, step S13 is followed directly by step S15 in which the display unit 150 displays a warning that the two programs overlap between their recording start times and recording end times.

Following the warning indication in step S15, the system controller 80 goes to step S16. In step S16, the system controller 80 displays a prompt display on the display unit 150 asking the user to specify whether or not to prioritize the overlapping programs. In step S17, the system controller 80 determines whether or not to prioritize the preset programs based on the presence or absence of a response from the user or on the contents of such a response.

If the user's response is to give priority to one of the preset programs, the system controller 80 recognizes the preferential selection and goes from step S17 to step S18. In step S18, the system controller 80 adds priority preset information to the unattended recording preset information in the RAM 84 regarding the preferred program. In step S19, an indication of the end of the unattended recording preset process appears on the display unit 150. At this point, the user watching the display may change the preset information as needed.

In step S20, the system controller 80 determines whether or not to end the unattended recording preset process. If no response comes from the user specifying changes in the preset information, the system controller 80 judges that the process can now be terminated and turns off the unattended recording preset routine.

If in step S20 the user specifies any change in the preset information for unattended recording, step S11 is reached again from step S20, and the unattended recording preset process is repeated from the beginning.

If in step S17 the system controller 80 judges that the user has no intention of prioritizing the overlapping preset programs, step S17 is followed directly by step S19. If in step S14 the system controller 80 judges that the two preset programs can be recorded simultaneously at the requested levels of image quality, the system controller 80 goes from step S14 directly to step S19. If in step S12 the system controller 80 judges that no preset programs overlap between their recording start and end times (this also applies where no previously preset program exists), then the system controller 80 goes directly to step S19 from step S12.

FIG. 6 schematically shows that digital broadcast programs A and B are preset both for high-image-quality unattended recording, with priority preset for the program A to be recorded preferentially.

In the example of FIG. 6, there can be three cases of how the preset programs A and B are recorded. In case 1, the priority-preset program A is recorded entirely at high image quality, while the nonoverlapping first half of the program B is recorded at high image quality with the overlapping second half of the program B recorded at standard image quality. That is because the apparatus with its processing speed has judged itself not up to the task once recording of the preferred program A has started.

In case 2, the priority-preset program A is recorded at high image quality in the same manner as in case 1, whereas the program B is recorded entirely at standard image quality. That is because the apparatus, with its hard disc units 61 through 63 of limited recordable capacities addressing the high-quality recording of the program A, has judged itself incapable of recording the program B at high image quality, including the first nonoverlapping part thereof.

In case 3, the programs A and B are both recorded at high image quality. That is because the system controller 80 judges in step S14 that, given the resources available, the two programs cannot be recorded simultaneously at high image quality; later at the start of recording of the program B, however, the system controller 80 judges that the processing speed of the apparatus and the remaining recordable capacities of the hard disc drives 61 through 63 warrant recording of the two programs A and B altogether at high image quality.

(How the Unattended Recording Preset Process is Implemented)

The above-described series of unattended recording presetting steps described above may be implemented by software. For such software-based processing to take place, programs constituting the software may be installed from a suitable storage medium into the system controller 80, i.e., a computer inside the recording and reproducing apparatus 10 that may be composed of dedicated hardware; if the apparatus 10 is constituted by a general-purpose personal computer capable of executing diverse functions based on different programs, the software may be installed from an appropriate storage medium into the computer.

As shown in FIG. 2, the storage medium is offered to users apart from the recording and reproducing apparatus 10 (i.e., computer) not only as a package medium constituted by the magnetic disc (including flexible discs) 131, optical disc (including CD-ROM (compact disc-read only memory) and DVD (digital versatile disc)) 132, magneto-optical disc (including MD (Mini-disc), a registered trademark) 133, or semiconductor memory 134; but also in the form of the ROM 83 or the hard disc units 61 through 63 in the hard disc drive 60 containing the programs and incorporated beforehand in the recording and reproducing apparatus 10 (working as a computer).

In this specification, the steps which are stored on a storage medium and which describe the programs to be executed represent not only processes that are carried out in the depicted sequence (i.e., on a time series basis) but also processes that are conducted parallelly or individually.

The unattended recording preset process may be executed not only by software but also by hardware alone.

(Other Variations)

Although the above-described embodiment is designed to compress video and audio data by MPEG standards, this is not limitative of the invention. Alternatively, other suitable compression schemes may be adopted. As another alternative, the data may be simply converted to digital data without being compressed or may be used in any format including non-compressed or non-converted format.

Although the recording and reproducing apparatus of the above-described embodiment utilizes hard discs as a storage medium, this is not limitative of the invention. Other media such as optical discs, magneto-optical discs or semiconductor memories may be employed instead.

As described and according to the invention, if a plurality of programs are preset for unattended recording in a manner overlapping between their recording start and end times, a check is made to see if the multiple programs can be recorded simultaneously. If the programs are judged recordable simultaneously, they are allowed to be so recorded; if the programs are not judged simultaneously recordable, they are prioritized so that the preferred program is given priority over others for unattended recording. The inventive apparatus thus allows the user to deal with overlapping preset TV programs for unattended recording in a manner highly manageable and optimally satisfying.

As many apparently different embodiments of this invention may be made without departing from the spirit and scope thereof, it is to be understood that the invention is not limited to the specific embodiments thereof except as defined in the appended claims.

What is claimed is:

1. An image recording apparatus comprising:
    means for storing recording preset information constituted by a recording start time and a recording end time of each of preset programs for unattended recording, a program input route through which to input each of said preset programs, and an image recording quality;
    means for judging whether any of said preset programs for unattended recording overlap between the recording start times and the recording end times of the programs;
    second means for judging whether the overlapping preset programs can be recorded simultaneously;
    means for giving a warning if any of said overlapping preset programs are not judged to be simultaneously recordable;
    means for prioritizing said overlapping preset programs for unattended recording;
    a plurality of audio/video inputs;
    a multiplexer/demultiplexer; and
    a buffer,
    wherein, when the second means for judging determines that the overlapping preset programs can be recorded simultaneously, the overlapping preset programs are simultaneously recorded onto a storage medium, and
    the second means for judging judges whether the overlapping preset programs can be recorded simultaneously based on the plurality of audio/video inputs, an operating speed of the multiplexer/demultiplexer, an operating speed of the buffer, and the image recording quality.

2. The image recording apparatus according to claim 1, wherein when the second means for judging determines that the overlapping preset programs can not be recorded simultaneously, the second means for judging determines whether the overlapping preset programs can be recorded simultaneously at a reduced image recording quality.

3. The image recording apparatus according to claim 2, wherein when the second means for judging determines that the overlapping preset programs can be recorded simultaneously at the reduced image recording quality, the overlapping preset programs are simultaneously recorded at the reduced image recording quality onto the storage medium.

4. The image recording apparatus according to claim 1, wherein when the second means for judging determines that the overlapping preset programs can not be recorded simultaneously, the second means for judging prioritizes recording of one of the overlapping preset programs.

5. The image recording apparatus according to claim 1, wherein when the second means for judging determines that the overlapping preset programs can not be recorded simultaneously, the second means for judging prioritizes recording of one of the overlapping preset programs based on a past preferential preset program selection.

6. The image recording apparatus according to claim 1, wherein when the second means for judging determines that the overlapping preset programs can not be recorded simultaneously, the second means for judging prioritizes recording of one of the overlapping preset programs based on preset times of the overlapping preset programs.

7. An image recording method comprising:
    storing recording preset information constituted by a recording start time and a recording end time of each of preset programs for unattended recording, a program input route through which to input each of said preset programs, and an image recording quality;
    judging whether any of said preset programs for unattended recording overlap between the recording start times and the recording end times of the programs;
    judging whether the overlapping preset programs can be recorded simultaneously based on a plurality of audio/video inputs, an operating speed of a multiplexer/demultiplexer, an operating speed of a buffer, and the image recording quality;
    giving a warning if any of said overlapping preset programs are not judged to be simultaneously recordable; and
    prioritizing said overlapping preset programs for unattended recording,
    wherein, when it is judged that the overlapping preset programs can be recorded simultaneously, the overlapping preset programs are simultaneously recorded onto a storage medium.

8. A non-transitory computer readable storage medium having stored thereon a computer program which when executed by a processor causes the processor to perform a method, said method comprising:
    storing recording preset information constituted by a recording start time and a recording end time of each of preset programs for unattended recording, a program input route through which to input each of said preset programs, and an image recording quality;
    judging whether any of said preset programs for unattended recording overlap between the recording start times and the recording end times of the programs;
    judging whether the overlapping preset programs can be recorded simultaneously based on a plurality of audio/video inputs, an operating speed of a multiplexer/demultiplexer, an operating speed of a buffer, and the image recording quality;
    giving a warning if any of said overlapping preset programs are not judged to be simultaneously recordable; and
    prioritizing said overlapping preset programs for unattended recording,
    wherein, when it is judged that the overlapping preset programs can be recorded simultaneously, the overlapping preset programs are simultaneously recorded onto a storage medium.

* * * * *